(12) United States Patent
Lopez et al.

(10) Patent No.: US 6,202,596 B1
(45) Date of Patent: Mar. 20, 2001

(54) RUMINAL BOLUS FOR ELECTRONIC IDENTIFICATION OF A RUMINANT

(75) Inventors: Gerardo Caja Lopez, Sant-Cugat; Joan Francesc Vilaseca Vintro, Barcelona, both of (ES); Christophe Korn, Taino (IT)

(73) Assignee: The European Community (LU)

( * ) Notice: Subject to any disclaimer, the term of this patent is extended or adjusted under 35 U.S.C. 154(b) by 0 days.

(21) Appl. No.: 09/029,261

(22) PCT Filed: Apr. 25, 1997

(86) PCT No.: PCT/FR97/00744

§ 371 Date: Feb. 11, 1999

§ 102(e) Date: Feb. 11, 1999

(87) PCT Pub. No.: WO98/01025

PCT Pub. Date: Jan. 15, 1998

(30) Foreign Application Priority Data

Jul. 9, 1996 (ES) ..................................... 9601530

(51) Int. Cl.[7] .............................. A01K 29/00; H04B 1/03
(52) U.S. Cl. ......................... 119/174; 128/899; 367/139; 501/66; 501/153
(58) Field of Search ................................ 119/51.02, 174, 119/859, 215, 908; 128/899, 903; 501/66, 68, 153; 367/2, 139

(56) References Cited

U.S. PATENT DOCUMENTS

| | | | |
|---|---|---|---|
| 4,262,632 | * | 4/1981 | Hanton et al. . |
| 4,366,253 | * | 12/1982 | Yagi ........................................ 501/63 |
| 4,992,794 | * | 2/1991 | Brouwers ................................ 342/51 |
| 5,121,748 | * | 6/1992 | Ditz et al. .............................. 600/302 |
| 5,148,404 | * | 9/1992 | Hilferink et al. ......................... 367/2 |
| 5,482,008 | * | 1/1996 | Stafford et al. ....................... 119/174 |
| 5,697,384 | * | 12/1997 | Miyawaki et al. .................... 128/899 |
| 5,840,148 | * | 11/1998 | Campbell et al. ................. 156/275.5 |
| 5,937,789 | * | 8/1999 | Platt ..................................... 119/174 |

FOREIGN PATENT DOCUMENTS

| | | | |
|---|---|---|---|
| 50687/93 | * | 11/1993 | (AU) . |
| 43 17 340 | | 1/1994 | (DE) . |
| 364045 A1 | * | 10/1989 | (EP) . |
| 0 480 530 | | 4/1992 | (EP) . |
| 0 646 313 | | 5/1995 | (EP) . |
| 2125698 | * | 3/1984 | (GB) . |
| 2165723 | * | 10/1984 | (GB) . |
| 2163346 | * | 2/1986 | (GB) . |
| WO 93 05648 | | 1/1993 | (WO) . |
| 95/17809 | * | 12/1994 | (WO) . |

OTHER PUBLICATIONS

F. V. Tooley, "The Handbook of Glass Manufacture," vol. 1, pp. 1–17, 1974, Books for Industry, Inc.*

* cited by examiner

*Primary Examiner*—Michael J. Carone
*Assistant Examiner*—James S. Bergin
(74) *Attorney, Agent, or Firm*—Bacon & Thomas

(57) ABSTRACT

The bolus is intended to be received in the reticulum of a ruminant. It comprises a body (10) having a housing (12) for containing a data interchange device (14). According to the invention, the body (10) is made of a material based on alumina, $Al_2O_3$, and/or on silica, $SiO_2$.

12 Claims, 4 Drawing Sheets

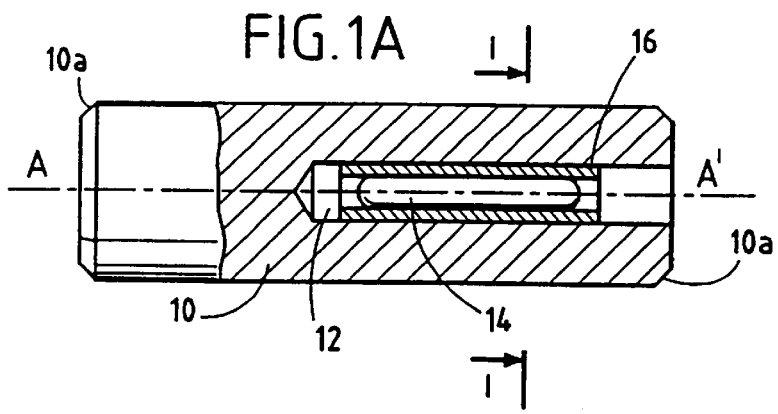
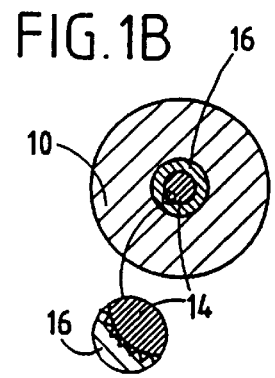
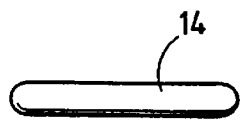
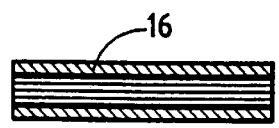
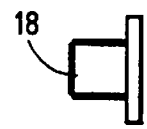
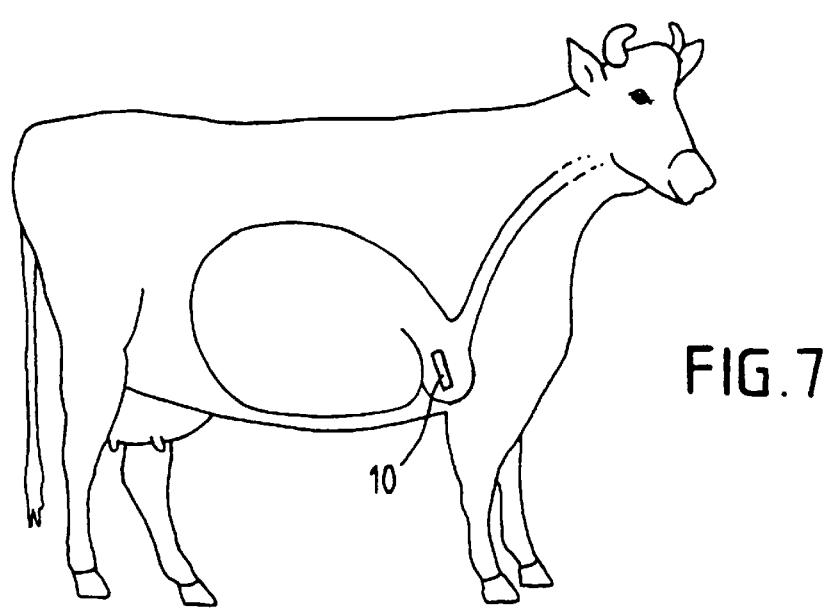

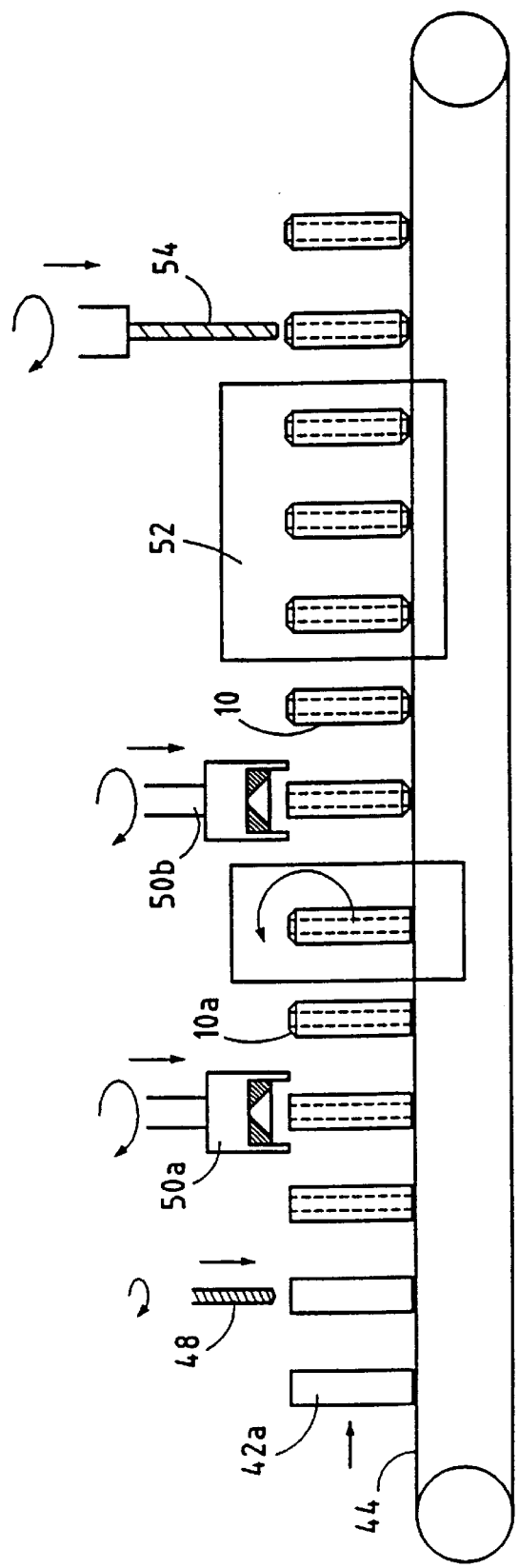

RUMINAL BOLUS FOR ELECTRONIC IDENTIFICATION OF A RUMINANT

The present invention relates to a ruminal bolus for electronically identifying ruminants. The invention is particularly, but not exclusively, intended for use with ruminants living under agricultural conditions (cattle, buffalo, sheep, and goats), but is also applicable to industrial, hunting, or wild uses (reindeer, deer, and ruminants in general). The bolus can be used with animals of large weight (above about 25 kg), or of small weight (less than 25 kg), depending on the variant of the invention.

A conventional ruminal bolus is constituted by a body having an electronic device for storing and interchanging data, which device resides in one of the stomachs or pre-stomachs of a ruminant for tracking purposes. Its main use is identifying animals, monitoring production (weight gain, milk production, monitoring reproduction, state of health, . . .) or for automating common operations concerning the management of such animals, such as feeding, or controlling access to restricted areas or controlling gates of classification runs, etc. In conventional manner, such information is delivered and picked up by means of electromagnetic waves.

Document U.S.-A 4 262 632 discloses an electronic identification system for herds of ruminants based on boluses, each comprising a transmitter which is administered orally as an alimentary bolus, and which is optimized to penetrate into the second pre-stomach referred to below as the "reticulum" (honeycomb) of a ruminant. That device is in the form of a cylinder that is about 75 mm long, having a diameter of about 18 mm. To prevent any regurgitation phenomenon, it is recommended for the density of the device to exceed 2 g/cm$^3$. To this end, provision is made to incorporate a weight inside the bolus, in the vicinity of the data interchange device.

Other types of known bolus can be received equally well in the reticulum or in the rumen (first pre-stomach).

By way of example, document WO 93--A-05 648 describes a bolus in the form of a cylinder or a flat capsule made of resin or of high density glass, and including an electronic device. That bolus is also provided with a continuous visible display system enabling the animal to be identified when the bolus is taken from a dead animal.

Document AU-A 64 92 12 describes an apparatus for identifying an animal based on a passive transducer included in a porcelain capsule and having a density of not less than 1.75 g/cm$^3$. That system includes a magnetic block making it possible to take hold of the system after the animal has been slaughtered. The porcelain capsule is filled with a dense liquid in order to obtain the desired specific gravity for maintaining the transponder in an operational position.

In other types of bolus, an elongate body is used having one end ballasted with a mass of metal so as to confer the required density thereto and so as to ensure that the body remains implanted in a vertical position in the rumen or in the reticulum. One such bolus is described, for example, in document WO-A-95 17 809.

Although the presence of a mass of metal is advantageous in that it makes it possible to increase the density of the bolus, it nevertheless suffers from the following drawbacks. Firstly, it interferes with radio transmission between the electronic device within the bolus and the outside, in particular by shifting the frequencies of tuned circuits. Secondly, it frequently happens that the stomachs of ruminants contain, whether deliberately or involuntarily, foreign bodies or magnetized pieces which tend to collect around the metal piece, thereby attenuating transmission and reception signals, or causing the bolus to be rejected or expelled.

In most cases, it is observed that known boluses tend, either deliberately or accidentally, to take up final residence in the rumen. They therefore suffer from the drawback of being incapable of being used successfully until the suckler animal has developed a rumen. The range at which they can be read, and the effectiveness of such reading are also limited by the large size of the rumen and by the frequently random orientation of the electronic device in use.

An object of the invention is thus to provide a high density bolus enabling small dimensions to be used and as a result making it possible to fix the bolus reliably in the reticulum (second pre-stomach) of the ruminant, accurately located against the left costal wall, behind the heart.

Another object of the invention is to make it possible to mass-produce boluses at low cost.

A more general further object of the present invention is to make it possible to obtain a bolus that avoids the drawbacks of prior art boluses.

According to the invention, these objects are achieved by a bolus for electronically identifying a ruminant, the bolus being designed to be received in the reticulum of the ruminant and comprising a body, itself having a housing designed to contain a data interchange device (such as an electronic transponder), the bolus being characterized in that the body is made of a material based on alumina, $Al_2O_3$, and/or on silica, $SiO_2$.

It has been discovered that alumina and silica provide two advantages, firstly they impart very high density to the body while presenting high resistance to the digestive juices and processes that take place in the pre-stomachs of ruminants. Secondly these materials are cheap and easy to use in mass-production methods.

In addition, these materials are non-magnetic and present excellent transparency at the radiofrequencies used for remotely interchanging data with the device housed in the body.

When the material is based on alumina, the content of the alumina present in the material is preferably not less than 60% by weight. Its content may lie in the range 75% to 99.5% by weight, and preferably lies in the range 80% to 99.5% by weight.

In a variant of the invention, silica represents the major portion by weight of the material. Under such circumstances, the silica can be present in the material at a content of not less than 40% by weight, preferably at a content of not less than 50% by weight, and more preferably, of not less than 55% by weight.

When silica is the majority material, alumina is preferably present in small quantities in the material, with the content of alumina preferably being less than 10% by weight, and more preferably less than 5% by weight.

In some variants of the invention, the alumina and the silica together constitute not less than 80% by weight of the composition of the material, and preferably not less than 90% by weight of the composition of the material.

To optimize the chemical composition of the material, it is possible to add thereto one or more of the following compounds: $MgO$, $CaO$, $BaO$, $Na_2O$, $K_2O$, $Fe_2O_3$, $TiO_2$. Each of these compounds may be present at a content lying in the range 0.1% to 2% by weight.

When the bolus is made with a silica-based material, it is possible to provide for the compound MgO and for the silica together to constitute not less than 70% by weight, preferably 80% by weight, and more preferably still 85% by weight of the composition of the material. Under such circumstances, the MgO content may exceed 2%, and may even exceed 25% by weight.

Advantageously, the bolus does not include any added metal pieces (apart from the electronic circuit of the data interchange device) so as to benefit from the non-magnetic nature of the material used.

The composition of the material in the above-specified ranges makes it easy to achieve density of not less than 2.5 g/cm$^3$. The density may be not less than 3 g/cm$^3$, or indeed not less than 3.5 g/cm$^3$.

Advantageously, the bolus is constituted by a symmetrical body with uniformly-distributed mass, such that its center of gravity and its geometrical center coincide.

In order to ensure that the bolus is properly fixed in the reticulum, the bolus is cylindrical in shape and circular in cross-section, with the edges of each of its ends being chamfered or rounded. This shape, in combination with an appropriate choice of dimensions, makes it possible in particular to fix the bolus in the direction of the major axis of the reticulum, in a position that is oblique and parallel to the diaphragm. This confers great stability and makes it possible to obtain optimum and uniform conditions for the electromagnetic link.

Such fixing can be obtained reliably when the ratio between the length and the radius of the bolus body lies in the preferred range of 2:1 to 5:1. Advantageously, this ratio lies in the range 2.5:1 to 4:1.

In a preferred embodiment for a bolus that is for use in ruminants of weight exceeding about 25 kg, and possibly reaching as much as 1,000 kg to 1,300 kg for bulls, the length of the body lies in the range 50 mm to 90 mm.

When the bolus is more particularly intended for use with ruminants of weight not exceeding about 25 kg, the length of the body preferably lies in the range 30 mm to 70 mm.

According to another characteristic of the bolus of the present invention, the housing for the electronic data interchange device comprises a cavity that is accessible from one end or from both opposite ends of the body. The cavity can be in the form of a blind hole on the main axis of the body or in the form of a through hole on the main axis of the body. Once the data interchange device has been put into place, the hole can be closed by means of an epoxy resin or a plastic cement that withstands the environment that obtains in the ruminant reticulum.

In a variant, the above-mentioned hole is closed at the or each end by means of a male part such as a pressure screw or a self-locking rivet suitable for fixing against the wall of the hole.

When the cavity is in the form of a through hole, it can be closed at each end by a self-locking rivet constituted by two separate elements, each having a portion of rod with a head at one end thereof, the two respective rods being disposed in such a manner as to engage via their free ends and to lock one within the other, clamping between them the data interchange device.

This disposition has the advantage of enabling the data interchange device to be installed prior to final assembly, and to ensure that it is accurately positioned automatically within the cavity. It also makes it possible to reduce the number of successive operations that need to be performed on the body of the bolus, since the device is put into place simultaneously with the rivet.

In a preferred embodiment of the invention, the bolus also includes a sleeve of resilient material designed to receive the data interchange device and having an outside diameter which enables it to fit without clearance inside the housing.

The present invention also provides a method of manufacturing a bolus of the kind described above, characterized in that it comprises the following steps: preparing a blend based on alumina, $Al_2O_3$, and/or based on silica, $SiO_2$; forming a preform for the body of the bolus from the blend; and subjecting the preform to a firing step.

If necessary, the method further comprises a step of giving the bolus body preform its final dimensions and of finishing it after the firing step. The firing step may be performed at a temperature lying in the range 1000° C. to 2500° C. Nevertheless, it has been found that excellent results for the intended application are obtained when the firing temperature is substantially equal to 1400° C.

In a preferred embodiment, the preform is made by extrusion and the extruded piece is cut to the general shape of the bolus body. Under such circumstances, the housing in the bolus body can be made by drilling prior to the firing step.

Nevertheless, it is also possible to make the bolus body by a molding method in which case the housing is formed simultaneously with the body.

Other advantages and characteristics of the invention appear on reading descriptions of preferred embodiments given purely by way of example and given with reference to the accompanying drawings, in which:

FIG. 1A is a longitudinal section view of a bolus constituting a first embodiment of the invention;

FIG. 1B is a section view on plane I—I of FIG. 1A;

FIG. 2 is a simplified longitudinal section of an electronic transponder suitable for being received in the bolus of FIG. 1;

FIG. 3 is a longitudinal section view of a sleeve for receiving the transponder of FIG. 2;

FIG. 4 is a side view of a self-locking rivet for closing the cavity in the FIG. 1 bolus;

FIG. 7 is a diagram showing the location of the bolus in a ruminant;

FIG. 8B is a simplified diagram of the last step in manufacturing a bolus, in continuation from FIG. 8A.

Figure 5:
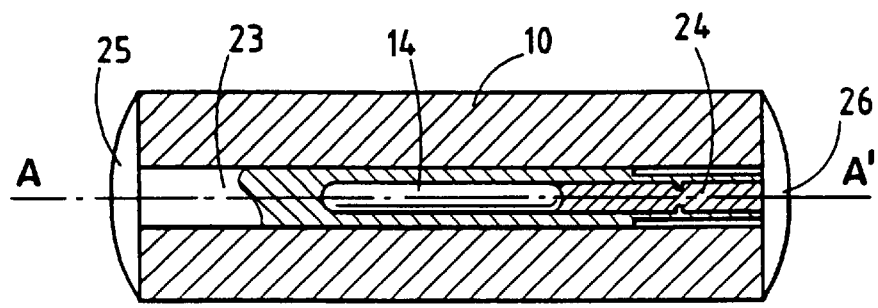
FIG. 5 is a longitudinal section view of a bolus constituting a second embodiment of the invention.

As shown in FIGS. 1A and 1B, the bolus 10 constituting the first embodiment of the invention is in the form of a cylindrical capsule of circular cross-section, having chamfered edges 10*a* at both ends.

Inside the capsule there is a cavity 12 of cylindrical shape and of circular section for receiving a data interchange device in the form of an electronic transponder 14 (FIG. 2). In this first embodiment, the cavity 12 is in the form of a blind hold on the main axis A—A' of the capsule.

It will be observed that the geometrical center and the center of gravity of the capsule coincide substantially (that is to say the capsule is not significantly unbalanced by the presence of the cavity 12 in the form of blind hole).

The transponder 14 used is of conventional type, comprising a passive transmitter/receiver activated at radiofrequency, with incorporated sensors enabling identification or data collection to be performed from the body of the ruminant, together with a storage circuit containing programmed or programmable code. This type of transponder is generally encapsulated in a cylinder of glass or clear plastic.

The data interchange device 14 is received in a sleeve of resilient material 16 such as an elastomer (FIG. 3). The outside diameter of the sleeve matches the cavity 12 of the bolus so that the transponder/sleeve assembly is received therein i.e. snugly, substantially without play. It has been found that the sleeve 16 provides excellent protection to the transponder 14 against mechanical and thermal shock while being transparent to radiofrequencies.

When the transponder 14 is in place, the blind hole is closed by means of epoxy resin or plastic cement that withstands the environment of the reticulum.

In a variant, the hole can be closed by a rivet as shown in FIG. 4.

For this purpose, it is also possible to use a pressure screw of plastics material, or any other known means enabling closure to be performed that is proof against and that withstands the digestive juices in the animal's reticulum.

FIG. 5 shows a bolus constituting a second embodiment of the invention. It differs from the bolus described above mainly by the fact that the cavity 12 is implemented in the form of a through hole on the main axis A—A' of the cylinder.

Figure 6:
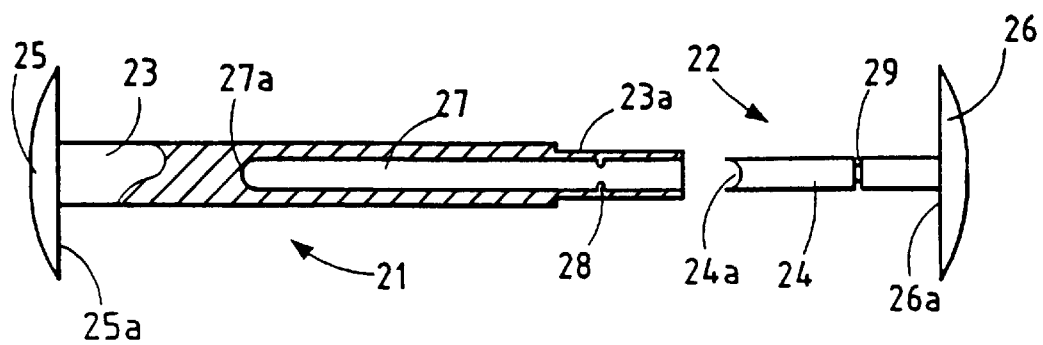
FIG. 6 is a longitudinal section view of a self-locking rivet used in the embodiment of FIG. 5.

In this embodiment, the hole may also be closed by a self-locking rivet device specially adapted to receive the transponder 14, as explained below with reference to FIG. 6.

The self-locking rivet device is constituted by two separate elements 21 and 22 each having a shank portion 23, 24 with a head 25, 26 at one end thereof. It is preferably made of a plastics material of the ABS type. The two shanks 23 and 24 are made so as to engage mutually via their free ends remote from their heads, and to lock one within the other while enclosing between them the transponder 14.

To this end, the shank 23 of a first one of the elements 21 is in the form of a cylinder of dimensions suitable for being engaged snugly in the hole forming the cavity 12 in the body 10 of the bolus. This shank 23 itself includes a recess 27 in the form of a blind hole that is accessible via its free end and that serves to receive the transponder 14. The end wall 27a of the blind hole is concave so as to fit closely over a first end of the transponder 14. A portion 23a of the shank 23 close to its free end is of smaller section having one or more longitudinal slots (not shown) enabling it to be engaged with the shank 24 of the other element by resilient co-operation. This smaller-section portion 23a includes a peripheral rib 28 on its inside surface constituting a portion of snap-fastening means.

The shank 24 of the second element 22 is circular in section and dimensioned so as to fit closely against the inside surface of the smaller section portion 23a of the shank of the first element 21. It includes a peripheral groove 29 for receiving the rib 28 on the first element 21, thereby forming the other half of the snap-fastening means. The free end of the shank 24 of the second element 22 has a hollow 24a on the longitudinal axis and suitable for fitting closely over the second end of the transponder 14.

Together the two elements 21 and 22 are shaped so that when the rib 28 of the first element is engaged in the groove 29 of the second element, the inside faces 25a and 26b of the respective heads are spaced apart by a distance corresponding to the length of the body 10 of the bolus. This disposition is achieved by the fact that the shank 23 of the first element has the same length as the body of the bolus; its end thus comes into abutment against the inside face 26a of the head of the second element when the self-locking rivet is in the snap-fastening position. Also, the respective positions of the end wall 27a of the blind hole in the first element 21 and the hollowed end 24a in the second element 22, once the elements are engaged one with the other, are such that the transponder 14 is received snugly in the axial direction of the bolus, and is located at the geometrical center thereof.

While the transponder 14 is being mounted in the body 10 of the bolus, the transponder is initially inserted into the blind hole 27 formed in the first element 21 of the self-locking rivet. This operation can be performed outside the body of the bolus, thereby making it possible to reduce the number of successive operations performed thereon.

Once the transponder 14 is retained in the first element 21, it is inserted via one end into the through hole 12 in the body of the bolus. The second element 22 of the self-locking rivet is then inserted via the other end of the body of the bolus and force is applied between the respective heads 25 and 26 until the rib 28 snaps into the groove 29. The rivet is then locked with the inside faces 25a and 26a of the heads bearing against the respective end faces of the body of the bolus.

It will be observed that in this second embodiment, the heads 25 and 26 can cover the entire surface of the end faces of the body 10 and can have outside surfaces that are dome-shaped. Under such circumstances, the edges of the body 10 need not be chamfered.

The particular choice of composition for the material of the bolus body, whether it is based on alumina or on silica, depends on several factors: manufacturing method, desired density, dimensions of bolus, etc. . . . , and these factors must take account specifically of the weight and the type of ruminant for which the bolus is intended.

In numerous cases, it is possible to envisage using a material comprising about 80% by weight alumina, $Al_2O_3$, and about 15% by weight silica, $SiO_2$.

The balance, in percentage by weight, may be shared in the range 0.1% to 2% by weight between the following substances: $MgO$; $CaO$; $BaO$; $Na_2O$; $K_2O$; $Fe_2O_3$; and $TiO_2$. Naturally, it is possible to use only one or only some of those substances, with appropriate matching of contents.

With such a composition, the density of the material may exceed 3.2 $g/cm^3$.

The porosity of such a material based on high density silica, $SiO_2$, and/or alumina, $Al_2O_3$, is negligible.

Three specific examples of composition for the material having a high alumina content and having the characteristics specified above are given below.

EXAMPLE 1

Composition of an alumina-based material for forming the body of the bolus and having a density of 3.2 $g/cm^3$. Substance $Al_2O_3$ $SiO_2$ $MgO$ $CaO$ $BaO$ $Na_2O$ $K_2O$ $Fe_2O_3$ $TiO_2$ Other % by weight 80.6 15.1 1.1 0.9 0.8 0.6 0.5 0.2 0.2 <0.1

First and second embodiment boluses of the invention have been made using the above composition. Their characteristics are summarized in Table I.

Table I

Characteristics of a first or a second embodiment of the bolus

Shape and dimensions

Cylindrical with flattened ends

Weight lying in the range 65 g to 70 g

Length=69 mm, diameter=20 mm

Cylindrical orifice (blind hole): length=45 mm, diameter=6.5 mm

Cylindrical orifice (through hole): diameter=8 mm

Physical characteristics of the material:

Rich in alumina and white in color
Porosity (%)=0
Density (g/cm$^3$)>3.2
Dielectric strength (kV/mm)<10
Thermal shock>1400°C.
Thermal conductivity from 20° C. to 100° C. (w/mkg)= 10–16
Coefficient of linear expansion at 600° C. (microns)=6–8
Bending strength (MPa)>200

EXAMPLE 2

Composition of the alumina-based material forming the body of the bolus and having a density of 3.5 g/cm$^3$. Substance $Al_2O_3$ $SiO_2$ MgO CaO BaO $Na_2O$ $K_2O$ $Fe_2O_3$ $TiO_2$ Other % by weight 95.0 3.0 0.6 0.5 0.2 0.2 0.2 0.1 0.2 <0.1

EXAMPLE 3

Composition of the alumina-based material forming the body of the bolus and having a density >3.8 g/cm$^3$. Substance $Al_2O_3$ $SiO_2$ MgO CaO Other % by weight 99.0 0.5 0.2 0.2 <0.1

The material of Examples 2 and 3 is particularly well adapted to ruminants of small size, of weight less than about 25 kg, such as young sheep or goats. It is thus possible to obtain a bolus having the general shape of the first and second embodiments, having a mass greater than 45 g or even 65 g, but with dimensions that are relatively small (e.g. 55 mm×15 mm or 60 mm×17 mm).

In a variant of the invention, the material forming the body of the bolus is based on silica $SiO_2$. In this case, the alumina content can be much smaller, e.g. being less than 10% or even less than 5%, by weight.

A silica-based composition is particularly suitable for use with a bolus of relatively large dimensions, e.g. greater than 65mm×20 mm, for use with ruminants of large weight (cattle, buffalo).

An example of such a material used for making a 75 mm×20 mm bolus is given below.

EXAMPLE 4

Composition of the silica-based material forming the body of the bolus and having a density of 2.8 g/cm$^3$. Substance $Al_2O_3$ $SiO_2$ MgO CaO BaO $Na_2O$ $K_2O$ $Fe_2O_3$ $TiO_2$ $P_2O_3$ Other % by 3.1 60 28.0 0.7 6.6 0.2 0.4 0.5 0.2 0.1 <0.1 weight It will be observed that it is preferable to make up the silica content with another compound, such as MgO or the like, such that the silica and the other compound together constitute not less than 70%, or 80%, or indeed 85% of the weight of the material.

The characteristics of density, general shape, and dimensions, given in the above-mentioned examples enable the bolus to remain permanently in the ruminant's reticulum, and this is done in the direction of the major axis of the reticulum (an oblique position), as shown in FIG. 7.

The use of a material based on high density silica or alumina for making the body of the bolus makes it possible to achieve dimensions that are optimized for administration by the mouth to numerous species of ruminant animals, and of any age.

When the boluses of the first and second embodiments described above are specifically configured for use with ruminants of weight exceeding 25 kg, the esophagus is large enough to enable the capsule to move down into position after being inserted into the back of the animal's mouth (close to the gullet), until it becomes permanently located in the reticulum of the ruminant (FIG. 7).

Because of its relatively small dimensions, the bolus can be administered merely by means of a medicine or "balling" gun as is commonly used by stockmen.

The design and characteristics of the capsule prevent it from coming to final rest in the rumen of the animal, the first and largest pre-stomach of ruminants (while food is moving during digestion and rumination). Nor can it be regurgitated back towards the mouth, nor can it pass into the subsequent portions of the digestive system of a ruminant (omasum, or third pre-stomach).

The design of a bolus and the characteristics of alumina or of silica make it possible to use a single type of capsule for all species of ruminant, regardless of age, providing they have appropriate weight. There is therefore no need to wait for the rumen to develop, as normally happens with age approaching the end of the suckling period, given that the capsule is placed in a fixed position solely in the reticulum.

The permanent localization of the capsule in the reticulum makes it possible to avoid erratic movement within the rumen. The large volume of the rumen reduces opportunities for defining the position of the capsule relative to the reticulum. The large volume of the rumen also reduces the effectiveness and the distance at which the electronic system placed in the capsule can be read.

The small size of the reticulum, its contractile characteristics, and the longitudinal disposition of its muscular fibers in the antero-posterior direction all contribute to ensuring that the capsule and the data interchange device is oriented fixedly in the same direction. This orientation increases the distance from which it is possible to read the device in the crano-caudal (longitudinal) axis of the animal and decreases the possible reading distance on the costal axis (transverse axis). This increases reading effectiveness when the animal comes up to a read point and reduces the possibility of confusion with other animals nearby.

Figure 8A:
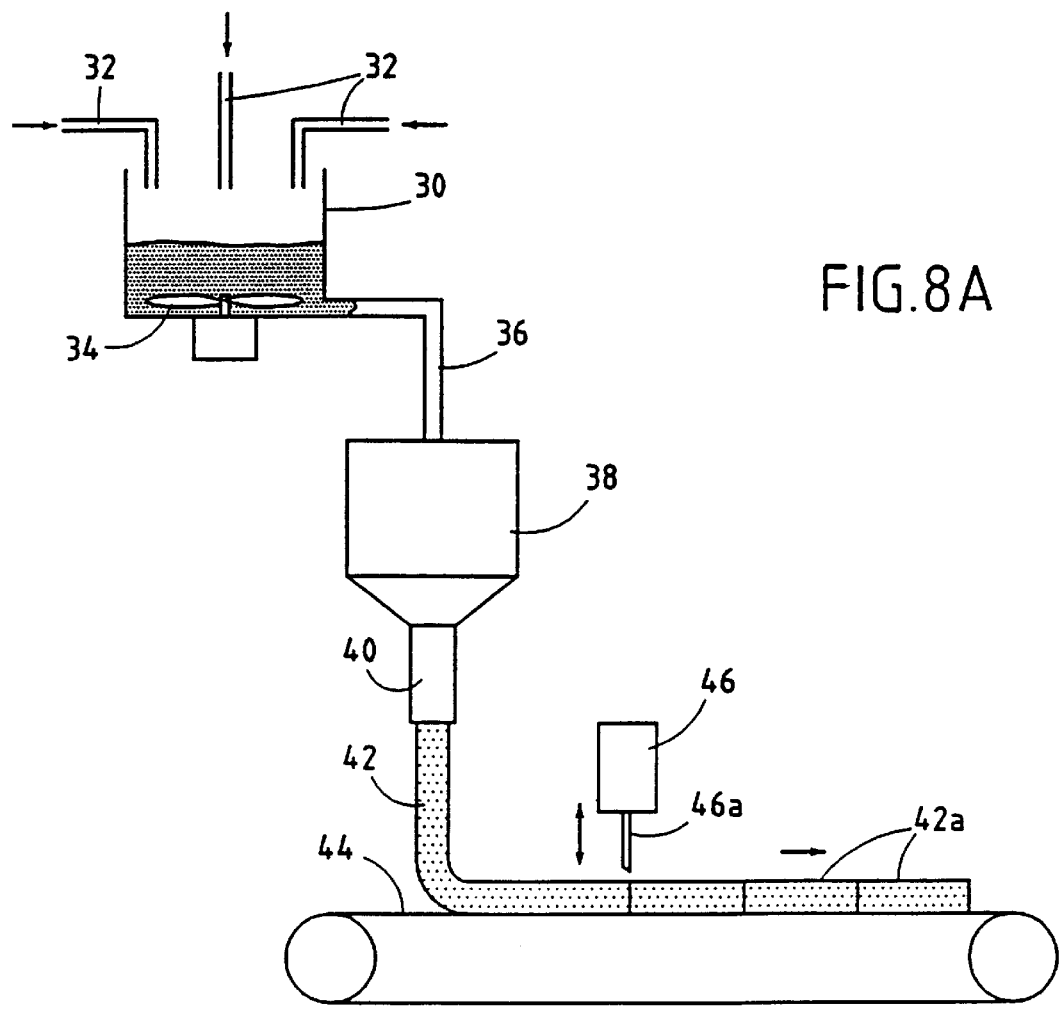
FIG. 8A is a simplified diagram showing the initial step in manufacturing a bolus in a preferred implementation of the invention.

There follows a description with reference to FIGS. 8A and 8B of the main steps in manufacturing the bolus in a preferred implementation of the present invention.

Firstly (FIG. 8A), a blend is prepared in a vessel 30 of the constituents of the silica- or alumina-based material that is to form the body of the bolus. These basic ingredients are fed to the vessel via respective ducts 32 to enable the method to be performed continuously.

The vessel 30 includes stirring means 34 and possibly also heating means (not shown) to ensure that the consistency and the blending of the material are optimal for extrusion.

The material is removed via the bottom of the vessel and is conveyed along a duct 36 leading to an extruder 38. The extruder is fitted with an extrusion head 40 in the form of a single orifice of outlet section corresponding to the section of the body of the bolus. At the outlet from the extrusion head, the material is in the form of a solid and continuous cylinder 42 that is suspended vertically down therefrom. This cylinder is laid on a conveyor belt 44 moving in a horizontal direction to various manufacturing stations.

Once on the conveyor belt 44, the cylinder of material 42 passes through a station 46 where it is cut up into cylindrical bars 42a of length corresponding substantially to the length of the finished product. In this example, the station 46 has a blade 46a oscillating at a frequency that matches the speed of the conveyor belt 44.

The bars 42a are then stood upright and pass through a drilling station 48 (FIG. 8B) to form a through hole in the axial direction of the body, said hole corresponding to the housing 12 in the first embodiment. When manufacturing a bolus body in accordance with the second embodiment, drilling is stopped before passing through both ends, in order to form a blind hole.

The bars then go through a first station 50a for forming a chamfered edge 10a on one of the ends of the bar 42a. After this operation, the bars are turned upside-down and pass through a second station 50b for forming a chambered edge, identical to the first, from which they are delivered having chamfers 10a at both ends, suitable for both the first and second embodiments of the invention. After these operations, a preform is obtained for the body having dimensions that correspond substantially to those of the final object.

The preform then passes to a firing station 52 where it is fired for a predetermined length of time. The firing temperature varies as a function of the specific composition of the material and as a function of the desired mechanical properties. In general, this temperature will lie in the range 1000° C. to 2500° C. For the composition of material specified in the example (Table I) and also for variants thereof, it has been found that a firing temperature of 1400° C. is preferable.

After firing, the preform is hardened and stabilized in dimensions. It then passes to a last station 54 (or set of stations) in which it is rectified to obtain a bolus having the final desired dimensions. In this example, the preform is subjected after firing to a reboring operation (station 52) to ensure that the housing is accurately dimensioned, so that it is sure to be closed properly with a self-locking rivet or with a pressure screw.

Naturally, the present invention makes it possible to implement numerous variants, as to shape, dimension, and specific composition of the bolus, and as to choice of data interchange device to be incorporated therein.

What is claimed is:

1. A bolus for electronically identifying a ruminant, the bolus being designed to be received in the reticulum of the ruminant and comprising a body itself having a housing designed to contain a data interchange device, wherein the body is made of a material having an alumina ($Al_2O_3$) content in the range of about 60% to about 99.5% by weight U.S. Pat. Application 09/029,261.

2. The bolus according to claim 1, wherein the body is made of a material having an alumina ($Al_2O_3$) content in the range of about 75% to 99.5% by weight.

3. The bolus according to claim 2, wherein the body is made of a material having an alumina ($Al_2O_3$) content in the range of about 80% to 99.5% by weight.

4. The bolus according to claim 1, which is substantially non-magnetic.

5. The bolus according to claim 1, wherein the center of gravity and the geometrical center of the body substantially coincide.

6. The bolus according to claim 1, wherein the body is substantially cylindrical in shape having rounded or chamfered edges.

7. The bolus according to claim 1, wherein the housing for the electronic data interchange device is accessible from one end or from two opposite ends of the body.

8. The bolus according to claim 1, which further comprises a sleeve of elastic material designed to receive the data interchange device and adapted to be received snugly in the housing.

9. The ruminal bolus according to claim 1, which is equipped with a data exchange device in said housing.

10. The bolus according to claim 1, wherein the density of the material is not less than 2.5 $g/cm^3$.

11. The bolus according to claim 1, wherein the density of the material is not less than 3 $g/cm^3$.

12. The bolus according to claim 1, wherein the density of the material is not less than 3.5 $g/cm^3$.

* * * * *